Dec. 30, 1969  A. G. WOODWARD  3,486,415
UNIVERSAL GRINDING AND MILLING HEAD
Filed Aug. 21, 1967  6 Sheets-Sheet 1

INVENTOR.
ALLEN G. WOODWARD
BY
Dugger, Peterson, Johnson & Westman
ATTORNEYS

Dec. 30, 1969  A. G. WOODWARD  3,486,415
UNIVERSAL GRINDING AND MILLING HEAD
Filed Aug. 21, 1967  6 Sheets-Sheet 2

INVENTOR.
ALLEN G. WOODWARD
BY
Dugger Peterson Johnson & Westman
ATTORNEYS

Dec. 30, 1969    A. G. WOODWARD    3,486,415
UNIVERSAL GRINDING AND MILLING HEAD
Filed Aug. 21, 1967    6 Sheets-Sheet 3

INVENTOR.
ALLEN G. WOODWARD
BY
Hugger Peterson Johnson & Westman
ATTORNEYS Dec. 30, 1969      A. G. WOODWARD      3,486,415

UNIVERSAL GRINDING AND MILLING HEAD

Filed Aug. 21, 1967      6 Sheets-Sheet 5

INVENTOR.
ALLEN G. WOODWARD
BY
Dugger Peterson Johnson + Westman
ATTORNEYS

United States Patent Office 3,486,415
Patented Dec. 30, 1969

3,486,415
UNIVERSAL GRINDING AND MILLING HEAD
Allen G. Woodward, Princeton, Minn. 55371
Filed Aug. 21, 1967, Ser. No. 662,085
Int. Cl. B23c *3/28, 7/00*
U.S. Cl. 90—11.62          10 Claims

ABSTRACT OF THE DISCLOSURE

A universal grinding and milling head which will fit onto the work table of a vertical milling machine and which has a work piece holding a spindle that receives rotational power from the work table feed screw to permit helical milling of a work piece with a vertical mill. Further, the universal grinding and milling head includes height adjustment means independent of the milling work table, adjustment means for rotation of the attachment about a vertical axis and about a horzontal axis (to permit milling tapers). The spindle work piece holder has interchangeability between the collet and three or four jaw chucks, spindle indexing means for positively positioning the work piece in any one of a number of preselected positions about its axis, spindle lock means to prevent rotation of the spindle and work piece, and the spindle can be axially moved to permit the helical edges of tools to be ground using the universal head on a grinder.

BACKGROUND OF THE INVENTION

Field of the invention

The present invention relates to attachments for vertical milling machines or the like which will permit vertical milling machines to do helical milling on a work piece and also is usable as a support for tools while they are being ground.

Discussion of the prior art

In the prior art, there are universal milling machines which are especially built for doing helical milling and which are extremely expensive. In ordinary small machine shops a vertical mill is a common item, but they are limited in their application and cannot be used for milling helical grooves in work pieces. There are attachments for vertical milling machines for indexing work pieces, and for adjusting the position of the work piece with respect to the cutting tool, but none of these will accomplish the helical milling of grooves in a work piece by rotating the work piece from a drive that is connected to the table feed screw for the milling machine.

SUMMARY OF THE INVENTION

The invention relates to a universal grinding and milling head which can be attached to vertical milling machines to make the machine adaptable for helical milling and any one of a number of different milling or grinding jobs, and also can be placed onto grinding machines so that helical edges can be ground and other tools can be ground with facility.

BRIEF DESCRIPTION OF THE DRAWINGS

FIGURE 5 is a sectional view taken as on line 5—5 in FIGURE 1;

DESCRIPTION OF THE PREFERRED EMBODIMENTS

Figures 1, 6, 7:
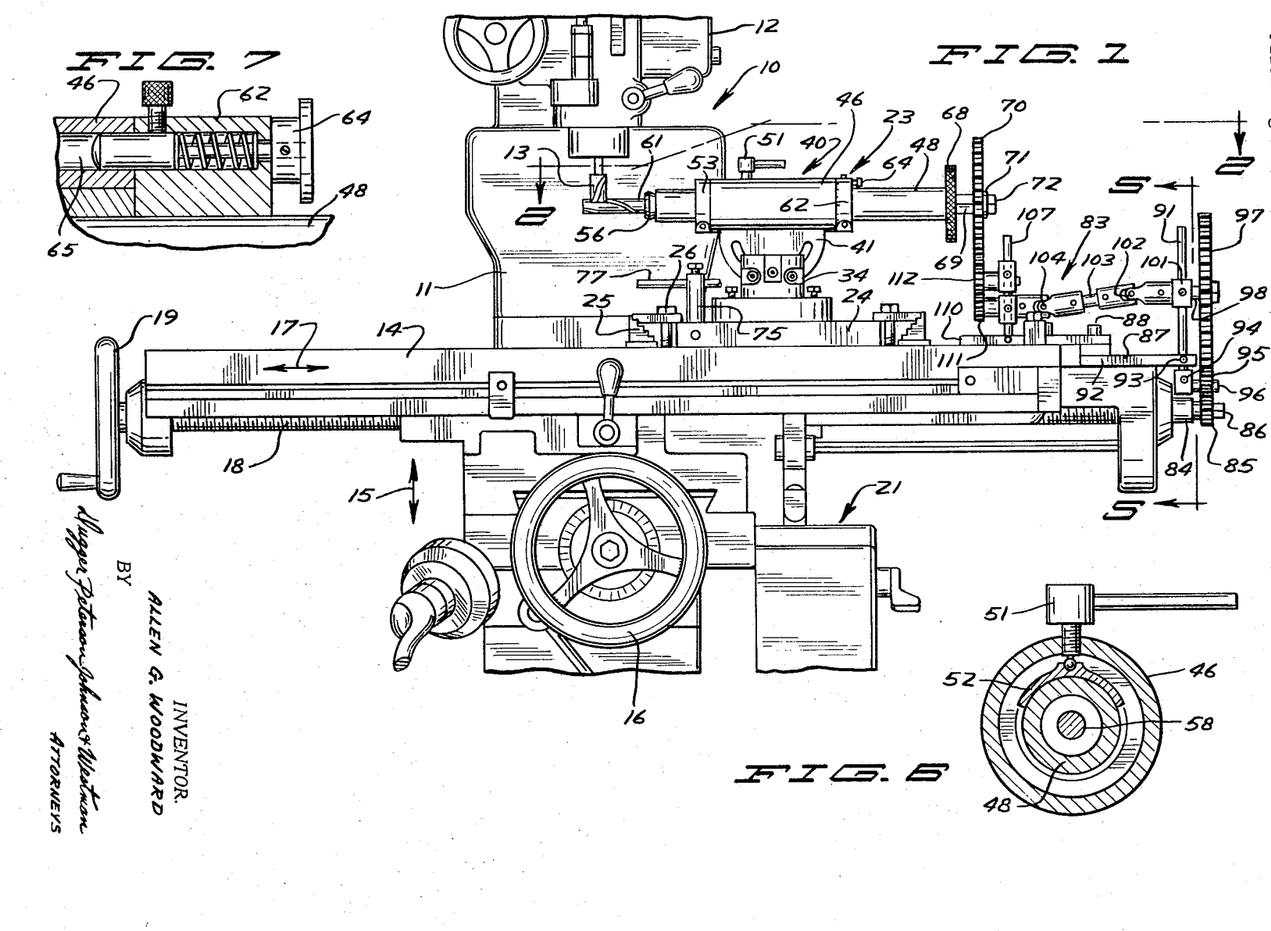
FIGURE 1 is a side elevational view of a vertical milling machine shown fragmentarily, and showing a universal grinding and milling head made according to the present invention installed on a milling machine.
FIGURE 6 is a sectional view taken as on line 6—6 in FIGURE 3.
FIGURE 7 is a fragmentary enlarged sectional view of an indexing collar and stop member made according to the present invention.

Referring to FIGURE 1 specifically, a vertical milling machine 10 is of conventional design, such as those presently in common use in machine shops and has a main housing 11 that contains a drive motor 12 that drives through suitable gearing or other drive means (not shown) to rotate a cutting tool 13 and rotate this cutting tool about a substantially vertical axis. The milling machine has a conventional work support table 14 which is adjustable in vertical direction as shown by the double arrow 15 through the use of suitable controls 16 and is movable in transverse direction as indicated by the double arrow 17 through the rotation of a table feed screw 18 operating on suitable mechanism to move this table on its bed in the transverse direction. The table feed screw 18 can be rotated with a hand crank 19 at one end thereof, or can be power driven through suitable gear drive mechanism that is conventionally used with vertical mills and is shown at 21. Thus by proper selection of controls, the table 14 can move in either direction as indicated by the double arrow 17 under power or can be rotated by hand.

The vertical mill just described is a conventional unit having all of the necessary adjustment indicators and locks for conventional milling.

One of the most serious drawbacks for conventional vertical mills is that they are unable to do helical milling either on a straight cylindrical surface or on a tapered or conical surface. Many machine shops which have vertical mills thus are obliged, when it comes to cutting a thread or a flute in a helical cutter, to send the work out or else not accept work of this type.

Figure 3:
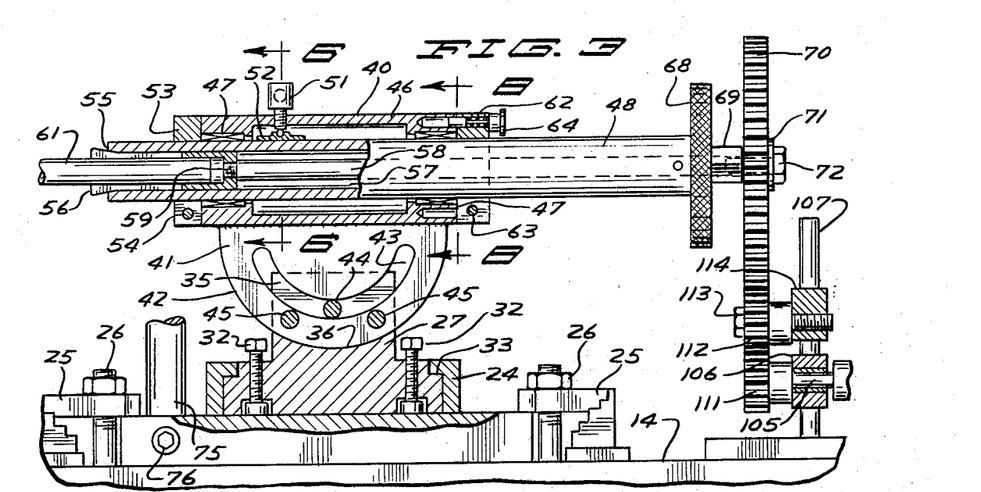
FIGURE 3 is a sectional view taken as on line 3—3 in FIGURE 2.
Figure 4:
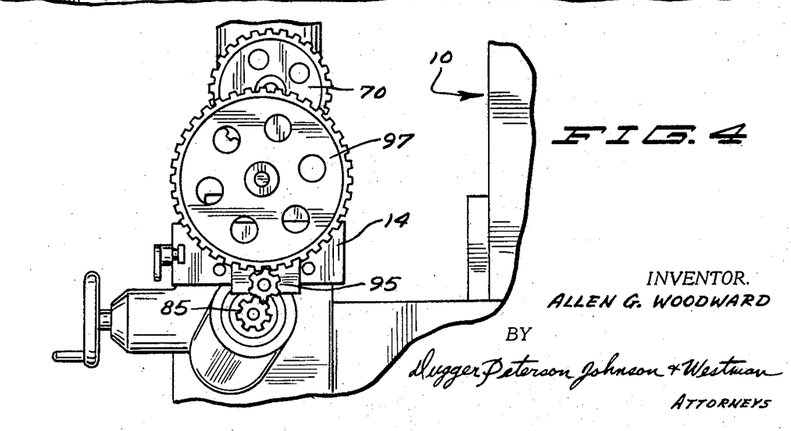
FIGURE 4 is an end view of the device of FIGURE 2, as viewed from the right end thereof.

However, to overcome these deficiencies in vertical milling machines, the present universal head illustrated generally at 23 has been advanced. The head 23 includes a support base 24 which is attached to provided holding grooves in the top of table 14 with suitable clamps 25 that are used with bolts 26 to hold the base 24 in position. As can be seen in FIGURE 3, the base 24 has an inner pedestal member 27 which is rotatably mounted inside the exterior member of the base about an upright or vertical axis and is free to rotate inside this housing, except when the unit is locked about the vertical axis. There is suitable indicia indicated at 30 on the rotatable member 27 and mating portions of the outer housing 24 so that the angular position with respect to a reference axis 31 bisecting the table 14 and extending in longitudinal direction can be maintained.

Lock bolts 32 are threadably mounted through the center of rotatable pedestal member 27 and will engage the surface of the table 14 to positively lock the pedestal member against the shoulder 33 of the outer member 24 and hold it in its proper position about its vertical axis. The center member or pedestal member 27 has a neck 34 which has a groove 35 defined therein and extending, as shown, parallel to and substantially along the axis 31. The bottom part of the groove 35 is formed in a part cylindrical bottom surface 36.

A spindle housing 40 includes a housing mounting member 41 which is of size to fit within the groove 35 and has a bottom part-cylindrical surface 42 which mates with the surface 31. The mounting member 41 also has a part-circular slot 43 defined therethrough and this slot has surfaces which are concentric with the surface 42. The neck 34 mounts through a guide bolt 44 which passes through the slot 43, and a pair of threadably mounted lock bolts 45, 45 which bear against the bottom part of the member 41, and when tightened will hold the member and the spindle housing 40 positively about a horizontal axis of the spindle housing. The horizontal axis of movement, of course, is the center used for generating the surfaces 42 and 36 and lies on the axis of the spindle housing. The friction from tightening the bolts or cap screws 45 is sufficient to hold the spindle in place.

The spindle housing 40 includes a mounting tube 46 that is attached to the member 41 and has suitable bearings 47 at opposite ends thereof. A recessed center section is also provided between the bearings 47. A tubular spindle 48 is rotatably mounted in the bearings 47 and extends through the spindle housing and is longer than the spindle housing. The spindle 48 is rotatably mounted in the bushings, but can be held from rotation by the tightening of a lock screw 51 threadably mounted through the wall of the tube 46 and having a friction pad 52 that engages the shaft and when the screw 51 is tightened, holds the shaft from rotation. The screw 51 has a small handle on it to get additional leverage. The pad 52 is mounted with a ball and socket to the screw and not only holds the spindle from rotation, but also keeps it from sliding axially, if it is free to do so.

At a first end of the spindle tube 46, which is adjacent the cutting tool 13, there is a split ring lock collar 53 that has a tightening screw 54 so that it can be clamped tightly on the periphery of the spindle 48 and will not move from this position. The split ring lock collar thus can abut against that end of the tube 46 and prevent the spindle from moving in direction away from the working tool. Adjacent this end of the spindle, as well, the inner surface of the hollow spindle is tapered, as shown at 55 and this taper is of size to mate with a taper on a collet 56, which is of standard design. The collet 56 fits inside the center opening 57 of the spindle and a drawbar 58 extends through the spindle and threadably mounts to the collet as at 59. As will be subsequently explained, tightening the drawbar 58 will pull the collet so that the conical surface of the outside of the collet collides with the surface 55 on the inside of the spindle and the collet can be tightened down onto a work piece 61, as is shown in FIGURE 3.

Figures 7, 8, 9, 10, 11:
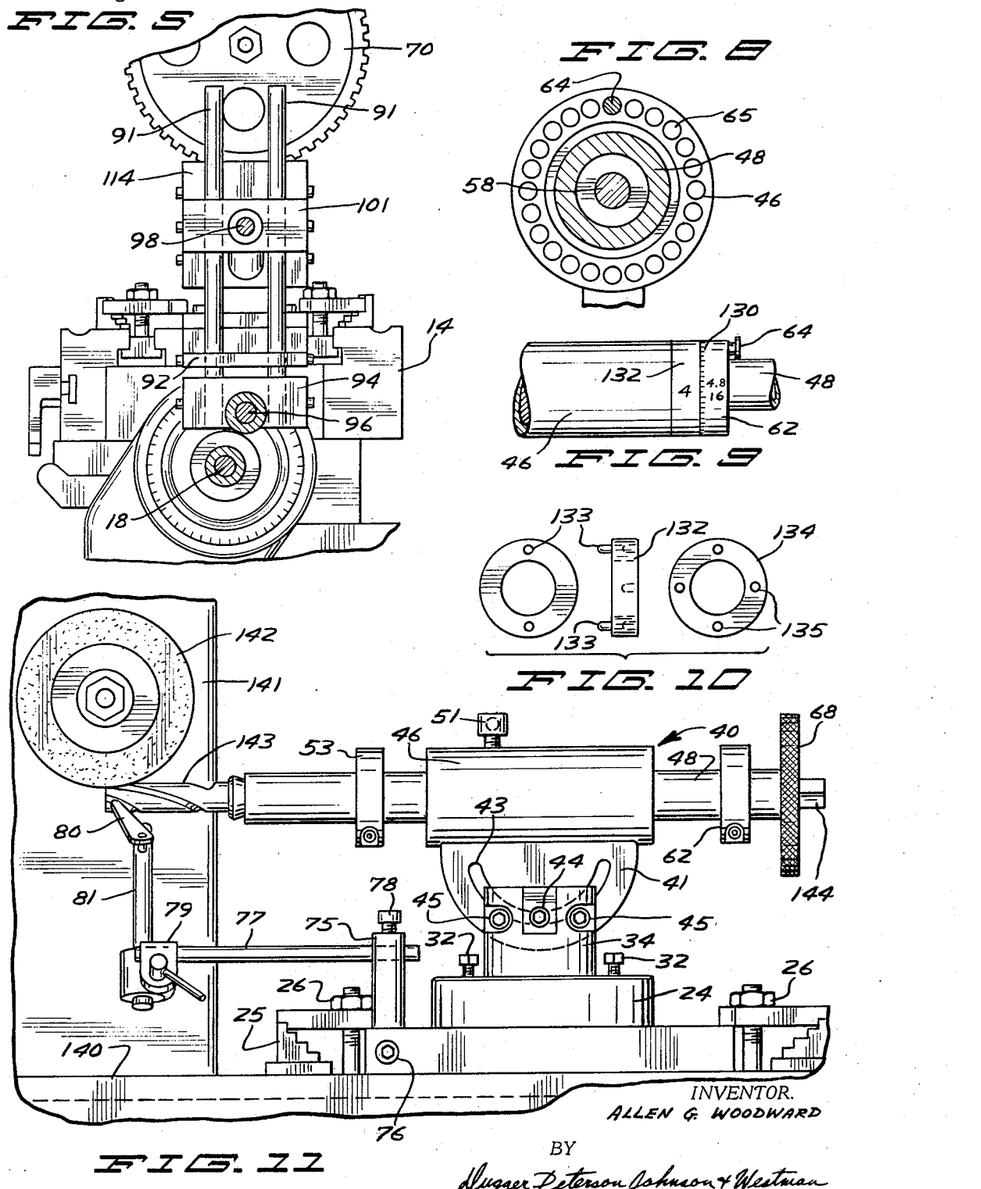
FIGURE 8 is a sectional view taken as on line 8—8 in FIGURE 3.
FIGURE 9 is a side elevational view showing an indexing adaptor used for indexing the head of the present invention in a preset number of positions about its axis.
FIGURE 10 is a combined front, side and rear view of an indexing collar installed in FIGURE 9.
FIGURE 11 is a side elevational view of the head of the present invention installed on a grinder and shown in position for grinding an edge of a cutting tool.

At the opposite end of the tube 46 there is also a split ring collar 62 which has a lock screw 63 that can be tightened down to hold the collar in position on the outside periphery of the spindle 48. The split ring collar 62, however, has an indexing pin 64 mounted therethrough in axial direction and spring loaded so that it will fit into any one of a plurality of indexing openings 65 defined around the periphery of the tube 46, as shown in FIGURE 8. These openings, 65, are positioned every fifteen degrees around the periphery of the tube 46 and when the spilt ring is mounted onto the spindle, by using the indexing pin 64, the spindle can be held at any angular position around the periphery thereof in increments of 15°. The indexer pin 64 can have a suitable lock to hold it in its open position to permit free rotation of the spindle when this is desired.

At the far end of the spindle 48, there is mounted a knurled hand wheel 68 which is used when the universal head is used for grinding helically fluted tools. This hand wheel 68 is frictionally held against the end of the spindle 48 by a spacer 69 clamped between a spur gear 70 and the hand wheel. The spur gear in turn is frictionally held by washers 71 that are held onto the drawbar 58 with a nut 72. Thus, by turning the nut 72, the drawbar 58 is pulled in direction away from the work tool end and tightens the collet 56 against the taper surface 55 to hold the work piece 61 in place and also clamp in place the gear 70 and the hand wheel 68.

It should be noted that the spindle length as shown is greater than the tube 46 and this will permit the axial positioning of the spindle with respect to the tube to be changed. In some instances of use, which will be explained, the lock collars 62 and 53 will be loosened or will be spaced apart a distance greater than the length of the tube 46 so that the spindle can move back and forth in axial direction a predetermined amount. This is also used for grinding the edges of helical tools. It is for doing this type of work that the hand wheel 68 is used. Where this type of work is not desired, the spindle can be of much shorter length and the gear 70 could be attached to the end of the spindle very closely adjacent the end of the tube 46.

An auxiliary attachment mounting post 75 is rotatably mounted to the base 24 and can be held in position about its upright axis with a set screw 76. The post 75 mounts a shaft 77 about a horizontal axis and the shaft 77 can be held with a set screw 78 about its axis. A universal clamp or guide member 79 is mounted on the outer end of shaft 77 and can be clamped in any axial position or any radial position on the shaft 77 and this member 79 also moves about an axis at right angles to the shaft, and can be clamped in any position there. The clamp 79 is used for mounting a shaft 81 having another adjustable shaft 82 mounted thereto. Shaft 82 mounts an adjustable guide finger 80, or other necessary instruments that will be further explained later. It could be used for mounting a dial indicator for checking run out of work pieces or the like, if desired. It will move in any direction because it has universal movement.

In order to do helical milling, it has been found that all that is necessary is to rotate the work piece 61 at the same time it is being translated or moved transversely to the vertical axis of the cutting tool 13. In order to obtain a very positive, known relationship between these two variables, namely the rotational speed and the translation speed in direction as indicated by arrows 17, it has been found that by driving the spindle and thus the work piece 61, from the table feed screw, gives this positive relationship whether the table is hand driven or power driven. Using spur gears for positive driving ratios insures that the desired lead of the helix will be obtained and will not be changed during cutting. As shown generally at 83, a quick change drive gear set up is used. The table feed screw 18 extends outwardly beyond the opposite end of the table from the handle 19 as at 84. There is normally a handle on this end of the table feed screw as well but this handle has been removed and in its place a spur gear 85 is frictionally drivably mounted directly on the end of the feed screw. Gear 85 is attached with a nut 86 which forces the gear against suitable backing to provide a friction drive that will slip, if the unit locks up, but will drive under normal conditions. In order to mount the mating gears to obtain the necessary ratios, a mounting plate assembly 87 is attached with suitable screws 88 to the top of the table 14, and is offset to meet the contours of the table as shown.

A pair of vertically oriented and vertically adjustable pins 91 are mounted at the outer end of the lower plate 92 of the plate assembly 87. As shown, the pins can be adjusted with suitable set screws 93 which bear against the pins and can hold them in position, but can be released to let the pins be slid up and down. As shown in the drawings, a block 94 is slidably mounted over the pins and held in place with a suitable set screw and this block 94 in turn is used for rotatably mounting a gear 95 on a pin 96. The pin 96 can be a shouldered bolt which will be threaded in the block and then the gear will rotate on the shoulder portion on suitable bushings. This could be changed to suit particular circumstances, but the gear 95 is an idler gear.

The gear 95 meshes with a large spur gear 97 that in turn is drivably mounted to a suitable shaft 98. The shaft 98 is rotatably mounted in a second block 101 that also is vertically adjustably mounted on the pins 91 and can be held with respect thereto with set screws. The opposite end of the shaft 98, on the opposite side of block 101 from the gear 97, is drivably attached to a first universal joint 102. The opposite end of the universal joint 102 is drivably mounted to a shaft 103 which is also, in turn, drivably mounted to a second universal joint assembly 104. The U-joint 104 is drivably mounted onto a shaft 105 (see FIGURE 3) that is rotatably mounted in suitable bushings in a block 106. The block 106 is mounted onto vertically extending and vertically adjustable mounting pins (there are two pins spaced apart and parallel) 107. The pins 107 are mounted onto an upper mounting plate 110 of the plate assembly 87. The block 106 and pins 107 can be held in place with set screws.

A spur gear 111 is in turn drivably attached to an opposite end of the shaft 105 from the U-joint 104 and this spur gear engages another idler gear 112 which is rotatably mounted onto a bolt or stud 113 that in turn is mounted onto a vertically adjustable block 114. The block 114 is mounted on the pins 107. The block 114, the block 106 and blocks 101 and 94, can be vertically adjusted on their respective pins by the use of set screws passing through a portion of the block and engaging one of the pins.

The gear 112 is positioned then to engage and drive gear 70 which is mounted on the drawbar 58.

Figure 2:
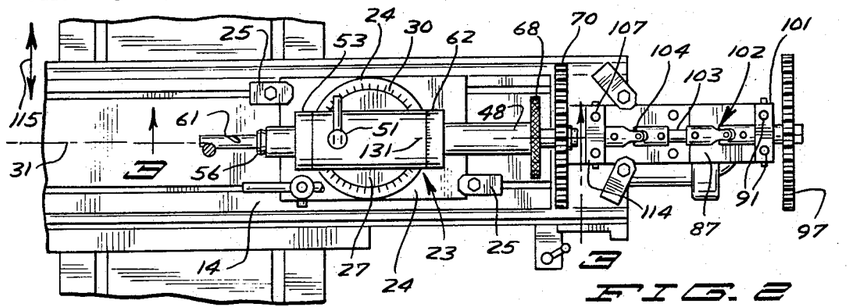
FIGURE 2 is a top plan view of the milling head attachment of FIGURE 1 and taken as on line 2—2 in FIGURE 1.

Assuming that the index pin 64 is released, and that the lock screw 51 is also released, rotating the screw 18 causes the work piece 61 to rotate at a preselected ratio (due to the gear size selection) in relation to its translation, and by properly vertically positioning the table, and also properly positioning the table in fore and aft direction as indicated by the arrow 115 in FIGURE 2, the cutting tool 13 can be made to engage the work piece. As the shaft 18 is rotated, the tool 13 will cut a helix in this work piece as shown in FIGURE 1. Thus immediately a conventional vertical milling machine becomes capable of doing the job of a universal milling machine or much more expensive machine. The universal head attachment makes this possible.

Further, the direction of the helix can be changed merely by taking out one of the idler gears, either 95 or 112. Changing the lead of the helix is done by changing the gear positions on the quick change set. As shown, the gears are mounted so that they can be removed fairly easily from their respective positions, and the sliding blocks can be moved up and down on the pins 91 or 107, respectively, to change the center distances for the gears and thus provide true quick change abilities. These universal joints permit the centers to be offset slightly between the first set of gears which drive directly from the table feed screw and the second set of gears which in turn drive directly to the spindle.

Figures 12, 13, 14:
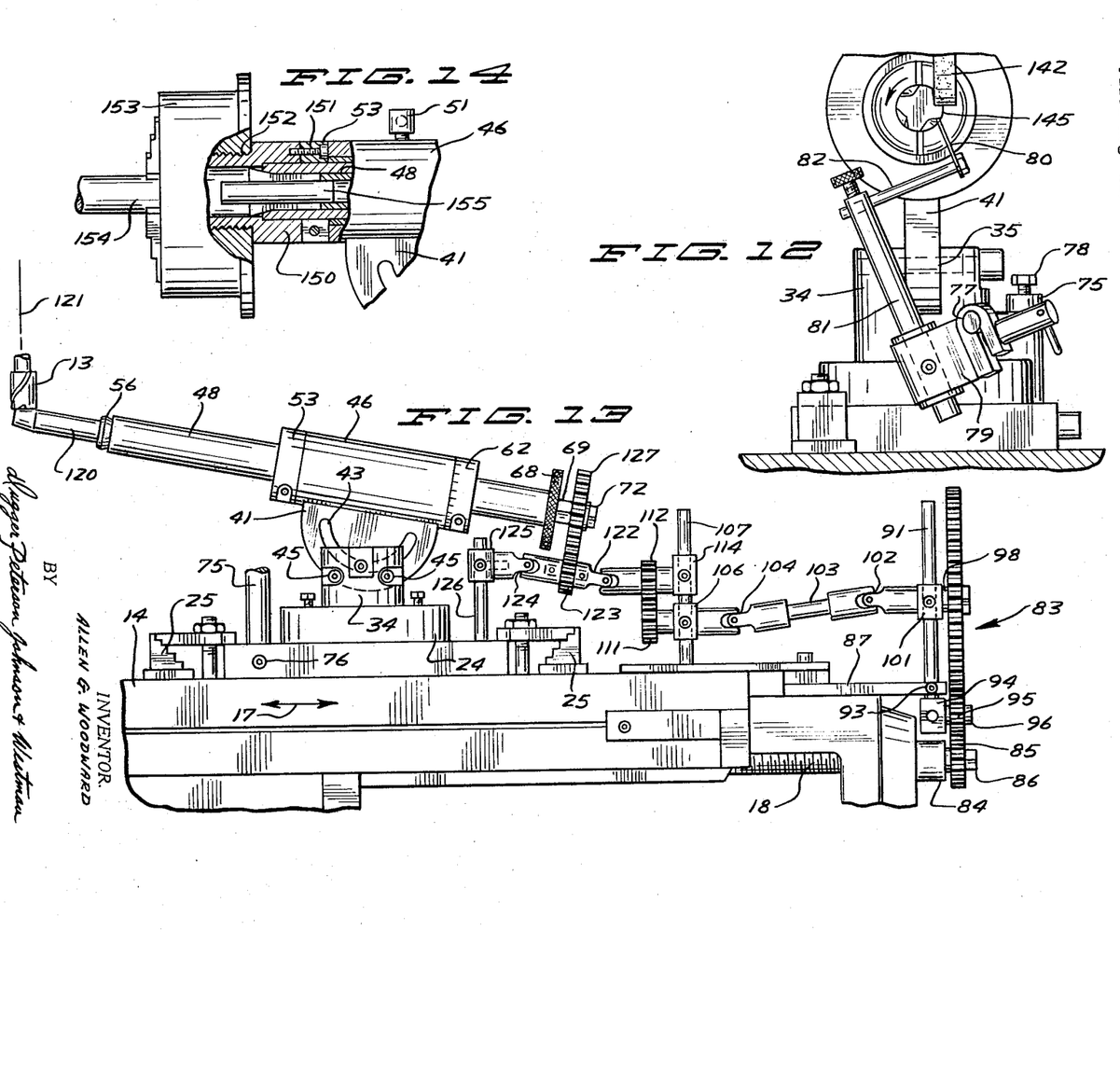
FIGURE 12 is an end view of the device of FIGURE 11 as viewed from the left end thereof.
FIGURE 13 is a side elevational view of the device of FIGURE 1 showing it in position to cut a taper or a helical taper.
FIGURE 14 is a fragmentary sectional view showing a chuck installed on the milling head of the present invention and showing a chuck installation adaptor in section.

In order to do tapered cutting, the device can be positioned and set up as shown in FIGURE 13. A new work piece 120 is inserted into the collet 56 and the spindle housing assembly is positioned at an angle other than horizontal. This is done by loosening the lock bolts 45 and permitting the mounting member 41 to ride on the pin 44 to the desired angle with respect to the horizontal or, stated another way, with respect to the vertical axis 121 of the cutting tool 13. In order to accomplish the driving of the unit, it is necessary to change the gearing set up somewhat. The primary gears will all remain the same back to the pins 107. However, a driving connection will be made between gear 112 and a universal joint assembly 122. This driving connection can be any desired type, such as a small set screw, pin or key. Universal joint 122 in turn mounts a shaft (internal) on which another gear 123 is drivably mounted. The shaft mounting the gear 123 is also drivably mounted to a second universal joint assembly 124, which in turn is rotatably mounted onto a shaft shown in dotted lines in FIGURE 13 that is attached to a block 125. The block 125 in turn is vertically slidably mounted on pins 126 that are mounted to the base 124 and serve to permit the block 125 to be adjusted. The block 125 also can be adjusted with set screws, which are plainly apparent in FIGURE 13.

A spur gear 127 would be provided at the end of the drawbar 58 mounted in the same manner as the spur gear 70 so that if desired, helical milling on a taper can be accomplished because of the drive directly connected to the table feed screw which both translates the work piece in direction as indicated by double arrow 17 and rotates the work piece about its axis through the drive just described. The milling of a taper can be accomplished without helical cutting as well, if desired just by angling the spindle 48 as described, but removing the drive to the spindle and using the indexers or by rotating the spindle without moving the support table.

One of the important features of the present universal head is that it adapts so easily to conventional indexing. The split collar 62 has indicia indicated at 130 thereon, and these indicia are divided into twenty-four segments, which are the same as the number of openings 65 in the spindle housing 46. The indicia have numbers behind them, as shown in FIGURE 9. If a work piece is to be cut having four sides, the collar is clamped in place as shown in FIGURE 1 and then the pin 64 is pulled back from the opening 65 and the spindle is rotated (the drive gears are also disconnected) until the numeral on the collar corresponding to the number of sides of the finished work piece aligns with the zero mark 131 (see FIGURE 2) on the tube 46. Then the milling cut is made on the work piece in the usual manner. If four sides are to be cut, the pin 62 is pulled back and the unit is rotated until the next number "four" appears and then the indexing pin is dropped into place so that the mark 131 and the number "four" on collar 62 align. This is done for four stops and a four sided work piece is made. The indicia for eight sides, sixteen sides or the like are also included on the collar 130 so that it is extremely easy to mill a plurality of surfaces on a work piece with the present indicating mechanism because it merely is a matter of lining up the correct numbers for the sides, for example four, eight or sixteen, with the zero mark and then going around the full circle and using each of the numbers as it appears on the collar. For example, using each of the numbers eight will give an eight sided work piece.

Further, for a set number of sides where high production is to be made, the device shown in FIGURES 9 and 10 is added to the unit. An indexing collar 132 is mounted over the spindle, and has a pair of dowel pins 133, 133 which fit into provided openings 65 and hold the indexing collar 132 from rotation with respect to the tube 46. The opposite surface of the collar indicated at 134 is provided with four openings 135 spaced 90° apart. This surface 134 mates with the surface of the split ring 62 through which the pin 64 protrudes. The pin 64 mates with the openings 135 and when dropped in place will index the work piece properly every 90°. This means merely that the pin is pulled out, released from one of the openings 135, rotated slightly and dropped and then the spindle is rotated until the pin 64 drops into the next opening 135.

It thus becomes apparent that any number of openings 135 can be provided so that proper indexing can be made on a very quick basis merely by pulling out the pin 64, releasing it and letting it come to the next opening. For example eight openings 135 can be provided or merely two if only two surfaces are to be milled.

Now, referring to FIGURES 11 and 12, a very important use of the universal head is shown. The head assembly 24 can be removed from the table of the vertical mill and moved onto the work table 140 of a grinder 141 which has a rotatably driven grinding wheel 142. The drive mechanism for the spindle is not used, but the clamps 25 are used for mounting it onto the table 140 or any suitable clamps can be used. Now, a helically fluted cutting tool 143 can be ground along the fluted edges with the present device. The tool 143 is mounted in the collet in the usual manner by drawing up the drawbar, except in this case a nut 144 is tightened against the hand wheel 68 to draw the collet tightly. The split ring collars 53 and 62 are loosened and slid apart along the axis of the spindle 48 so that there is a considerable space left for axial movement of the spindle, with respect to the tube 46 for the spindle mounting housing. The split rings are then clamped in place so that they provide positive stops for axial movement of the spindle.

The guide finger 80 is adjusted so that the outer end portion of the finger fits in back of a flute 145 (see FIGURE 12) of the cutting tool 143, when the grinding wheel 142 is in position grinding the cutting edge of this tool. Once the finger 80 is properly positioned with respect to the cutting tool 143 and the grinding wheel, then the unit is merely shoved longitudinally and the guide finger 80 will drive the unit rotationally at the proper angle so that the grinding wheel 142 will grind the cutting edge of the cutting tool. Thus the unit becomes a tool grinder. The guide finger will spring out of the way when the tool is rotated in direction as indicated by arrow 146 so that the next flute can be caught, the unit will then be rotated rearwardly so that the finger engages the backside of the next flute on the cutting tool 143 and the grinding operation then repeated. The axially slidable spindle permits this great adaptability for universal use on milling or grinding as shown. The split collars provide positive stop so that the unit will not be damaged by running it into the grinding wheel.

Thus it can be seen that the universal head can be used in connection with a vertical milling machine which has a milling axis at right angles to the axis of rotation of the spindle and is positioned above the spindle to cut tapers, cut helical grooves, can be used as an indexing head for cutting any number of surfaces on a work piece, can be rotated about a vertical axis, or a horizontal axis at right angles to the axis of rotation of the spindle, can be axially adjusted for length to properly position the work piece, and in general can be used for practically any milling job which requires the work piece to be held at right angles to the cutting tool.

Not only that, the collet can be replaced with a chuck, as shown in FIGURE 14. An adapter collar 150 can be bolted on to the split ring collar 53 with suitable cap screws 151, and then the split ring can be clamped onto the outside of the tube as shown to hold the adapter 150 in place and rotated with the spindle 48. The adapter 150 has threads 152 which are used to mate with internal threads of a three jaw chuck (as shown) 153. The chuck is of conventional design and can be either three jaw or four jaw and the chuck then can be used to hold a work piece 154 in the jaws.

Not only that, the collet can be left in place and a short stop member 155 clamped into the collet by tightening the drawbar as previously explained. The clamping of this stop member expands the wall of the spindle sufficiently to hold the adapter 150 and the split ring 151 in place in and of itself, but the additional clamping of the split ring also tends to help to hold and drive the chuck. The stop 155 can be adjusted so that the work piece 154 can be butted up against this stop 155 to get the proper depth if it is going to be used as a cut off assembly or something similar. Again, universal usage becomes readily apparent by the addition of the adapter 150 to bring in the possibility of mounting a chuck on the head. When used as a grinder, the split rings are spaced apart so that the spindle can be slid axially and the drive from the table feed screw is not used. The guide finger is used for providing a positive rotation of helically fluted members that are to be ground merely by sliding the spindle axially and letting the finger do the rotational driving. The grinding is thus precise. Of course, it can be used for hand grinding as well.

Figures 15, 16:
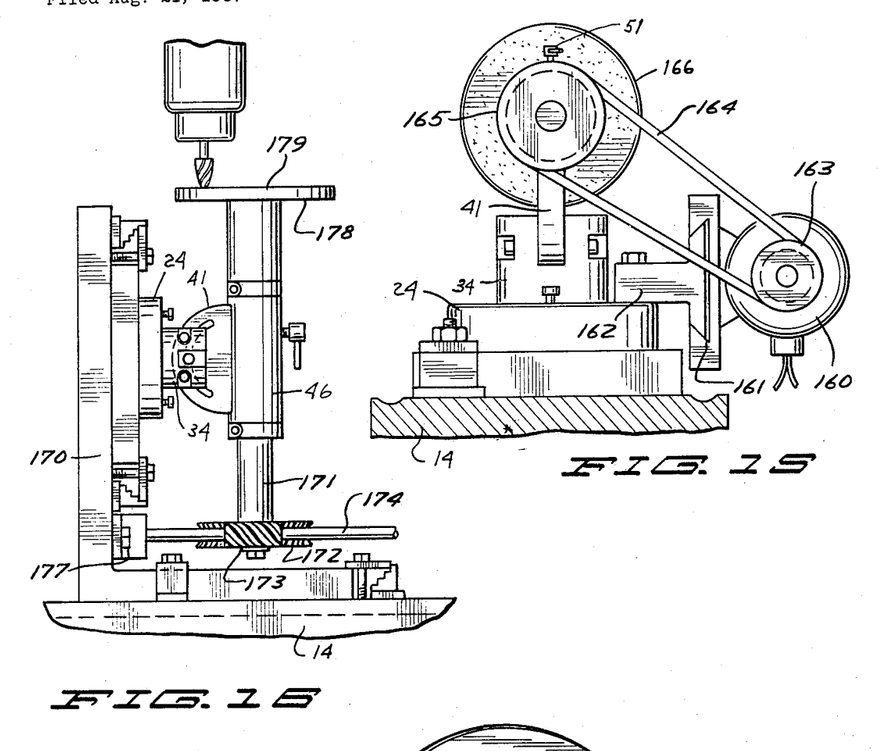
FIGURE 15 is a part-schematic view showing an electric motor positioned to drive the spindle used with the attachment.
FIGURE 16 is a fragmentary side view of the attachment used with the spindle axis vertical.

To further show the adaptability of the present device, in FIGURE 15, a milling and grinding head is shown using a separate electric motor for driving the spindle 48. This would permit the use of the spindle on the table of a vertical milling machine for driving a grinding wheel. For example, the motor 160 is mounted onto a dove tail motor mounting assembly 161 which has a first piece 162 fixed to the mounting housing for the spindle and a second mating piece on the motor to permit the motor to be mounted and removed quickly. The motor 160 has an output shaft driving a pulley 163 and a belt 164 to rotate a pulley 165 that in turn would be mounted on the outer end of the spindle. This pulley could just take the place of the spur gear 70 shown and then the spindle would be rotated. A grinding wheel 166 can be mounted directly onto the opposite end of the spindle for use of the housing as a grinder. The motor would be removed except for the grinding operations.

Figure 17:
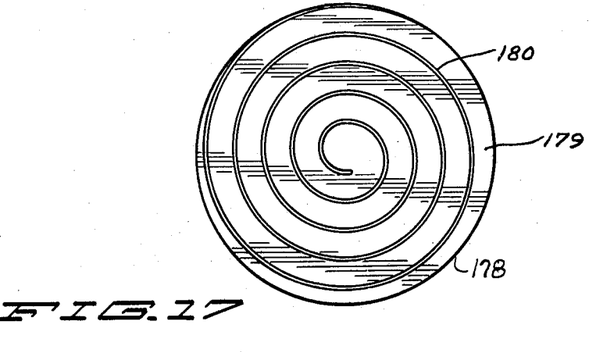
FIGURE 17 is a plan view of the work piece that can be milled with the set up of FIGURE 16.

Shown in FIGURE 16 is an adaptation of the spindle assembly where it is mounted so that the axis of rotation of the spindle is vertical with respect to the table of the milling machine. Using the milling cutter and head previously shown, a right angle mounting bracket 170 is bolted onto the mill table 14 and the spindle assembly is mounted onto the upright section of this right angle bracket. The spindle housing and everything would be the same, except a short spindle 171 would be rotatably mounted in the housing 46 and a worm gear 172 would be drivably mounted to the spindle in place of the spur gear 170. A worm 173 is drivably mounted onto a shaft 174 that is driven from the change gears, for example gear 111 or 112 and would have a second end mounted in a bearing block 177. Upon rotation of the worm 173 from the drive previously described (driven from the table feed screw) the spindle 171 rotates about a vertical axis and would drive the work piece 178 held therein. By engaging the work piece 178 with the cutter and translating the table 14, a spiral groove could be cut in the upper surface 179 of the unit. As shown in FIGURE 17, this groove 180 would be a true spiral and of course the lead of the spiral would be dependent upon the gears selected so that the speed of rotation of the spindle 171 with relation to the movement of the table 14 would be at the desired rate.

Figure 18:
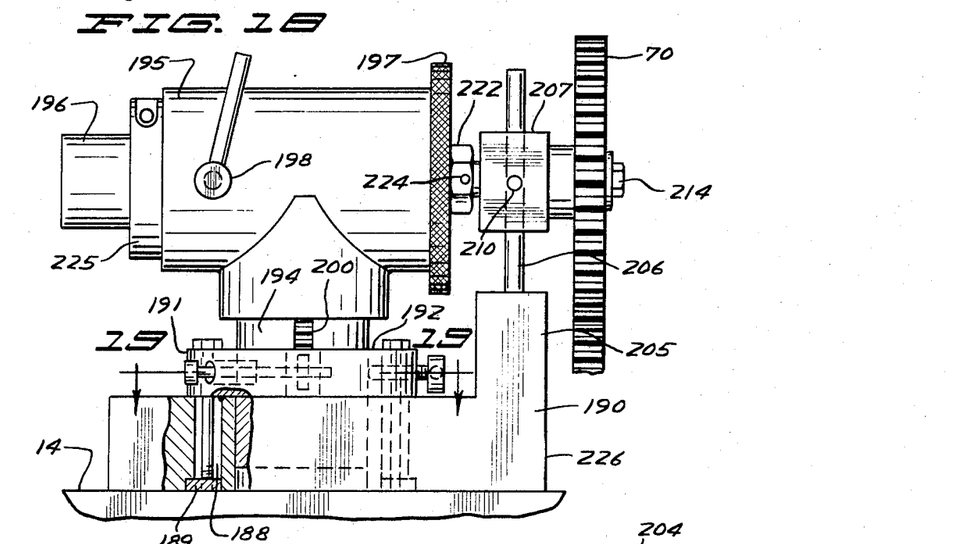
FIGURE 18 is a side elevational view of a modified version of the present invention showing means for elevating and lowering the spindle.
Figures 19, 20:
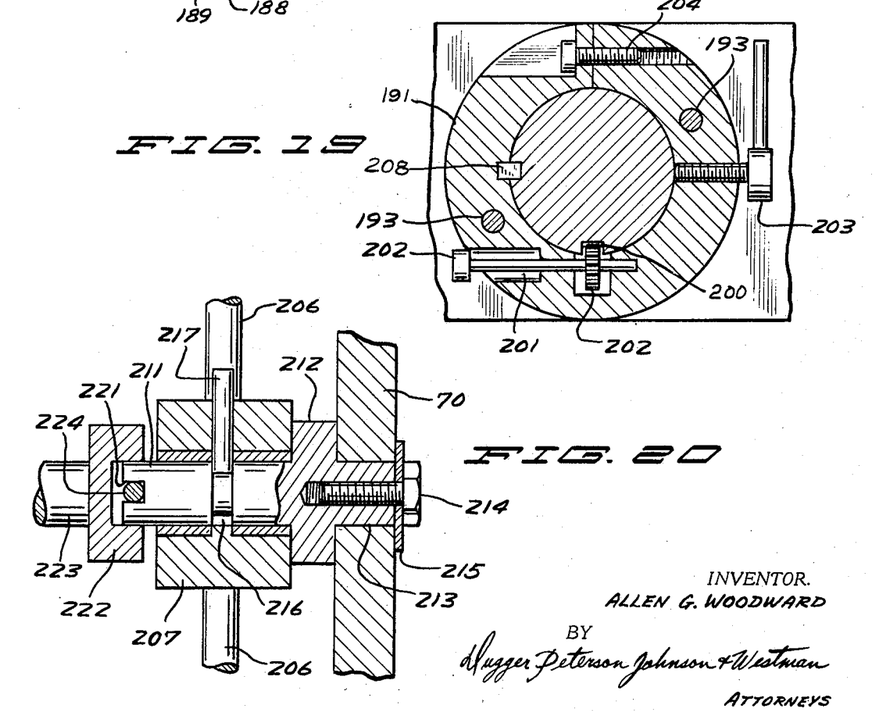
FIGURE 19 is a sectional view taken as on line 19—19 in FIGURE 18.
FIGURE 20 is a fragmentary vertical sectional view showing a drive portion of a device of FIGURE 18.

Referring now to FIGURES 18, 19 and 20, a modified version of the present invention is illustrated. The unit is still mounted onto the work table 14 of a vertical milling machine and is positioned on the table so that it will be usable with the work tool shown. In this form of the invention, the unit includes a sub-base or block 190 that clamps directly into the work table 14 and is used for the mounting support for the spindle assembly. Sub-base 190 mounts a sleeve 191 that has a collar 192 at the top thereof. The sleeve 191 fits within a provided opening 188 in the sub-base and the collar abuts against the top surface of the sub-base. The sleeve is held in place with suitable bolts 193 that pass through the opening 188 and thread into a locking ring 189. The locking ring and the collar clamp together onto the sub-base and are held thereby. The sleeve 191 has a center opening also and this opening is of size to receive a cylindrical column 194 that in turn mounts a spindle housing 195 in which a spindle 196 is rotatably mounted in the usual manner. The spindle 196 has a hand wheel 197 drivably attached thereto as in the previous forms of the invention and a suitable lock screw 198 can be provided. The hand wheel itself can be provided with indicia to indicate the number of degrees of rotation from a reference starting point marked on the spindle housing and also the assembly includes a spring loaded indexing pin that locks into openings in the hand wheel and which will permit the spindle to be indexed as previously described. The column 194 has a rack gear sector 200 mounted therein on one side, and the collar 192 has a provided opening therein to rotatably mount a shaft 201 that in turn drives a pinion gear 202. The pinion gear is made so that it engages the rack 200 and will move the rack up and down as the pinion gear rotates.

The shaft 201 has a driving head 202 thereon which is used with an "Allen" or socket wrench or any other type of wrench to rotate the shaft and move the column 194 and the spindle housing 195 up and down in vertical direction. A lock screw or locking lever 203 is also provided on the collar to lock the column. In addition to the locking lever 203 which will bear against the column 194 when tightened to hold the column in position, the collar 192 is split and a locking screw 204 can be tightened to clamp the collar down onto the column to hold it in heavy going or in other difficult to hold places. A key 208 is mounted in the collar 192 and slides in a keyway in the column to prevent relative rotation therebetween as the column moves up and down.

The spindle housing 195 is securely fastened to the column, and merely by loosening the screw 204, if it is tightened, and loosening the locking lever 203, and then rotating the shaft 201 to drive pinion 202, the column will be raised and lowered. It can be set at any desired vertical position so that the axis of the spindle can be made to align with the gear drive assembly to insure that the universal joints shown previously do not have excessive angularity that will cause whipping.

Also shown in FIGURE 18, is a new way of mounting the main drive gear 70 to drive the spindle. The sub-base 190 has an upright portion 205 (forming an L-shape) which mounts a pair of spaced apart vertical pins 206. These pins 206 in turn slidably mount in a vertical direction a mounting block 207. The pins 206 are spaced apart just like the pins that mounted the bearing blocks in the previous form of the invention. The block 207 can be held in place on these pins with a suitable set screw 210.

The block 207 is of size to receive and house a stub shaft 211. The shaft 211 has a flange 212 at the outer end thereof. The flange 212 has a pilot portion 213 which in turn mounts the gear 70 (same as the first form of the invention). The gear is held in place with a cap screw 214 bearing against a washer 215 which in turn bears against the gear and forces it against the radial surface formed by the pilot portion 213 to frictionally drive the shaft 211 from the gear 70.

The shaft 211 has an annular recess 216 defined in the center thereof and this recess 216 aligns with a pin 217 slidably mounted in the provided opening in the block 207. The pin 217 can be dropped into this recess 216 and will hold the shaft from axial movement when it is in place. The shaft can still rotate, of course. This means that to remove the shaft all that has to be done is to pull the pin 217 up and the shaft can be pulled axially out.

The second end of shaft 211 has a cross slot 220 defined therein. This end of the shaft 211 fits within a provided opening 221 in the hex shaped hollow end 222 of a drawbar 223 which takes the place of the drawbar 58 in the previous form of the invention that is used for holding collets in the spindle. The drawbar 223 passes through the center of the spindle 196 and when tightened up in the collet will hold the work piece securely in place. The end portion 222 has a cross pin 224 mounted therethrough. The end of shaft 211 fits within the recess in the hex end of the drawbar and the cross pin 224 fits within the recess 221 of the shaft 211. Thus the shaft 211 will drive the drawbar and in turn drive the spindle.

It can thus be seen that the drive to the spindle can be easily inserted or removed merely by pulling the pin 217 and pulling out the entire shaft assembly 211 which would leave the gear 70 mounted in plate. To re-engage the drive, the shaft 211 is merely slipped through the provided opening and the pin 217 is put into place and the unit will be ready to drive. The gear 70 will mesh with the previous gears shown and the drive from the table feed screw will be exactly the same as before.

A split collar 225 is provided at the opposite end of the housing from the hand wheel 197 and clamps onto the spindle 196 to hold it axially in place. As can be seen, this is a short spindle. The hand wheel 197 also drives the spindle 196.

The mounting for the sleeve 191 is made so that the bolts 193 that tighten against ring 189 merely clamp the ring and the collar 192 together frictionally to hold the sleeve from rotation within the opening 188 in which the sleeve is mounted. The sleeve can be rotated about the upright axis to any desired rotational position with respect to the sub-base 190 merely by loosening the bolts 193 and rotating the sleeve to position, and then re-tightening the bolts to frictionally hold the unit in place. The small upright member 205 in the sub-base 190 also makes it easy to place the entire spindle assembly in an upright position merely by clamping the side surface 226 of the sub-base onto the table 14. Then the spindle axis will be upright and the drive can be through the worm gears previously described.

It should be noted that in all of these forms that a steady rest can be placed at the outer end of the work piece if desired in order to maintain the piece stable enough for satisfactory milling.

The latest form of the invention will perform the operation previously described, such as helical milling, tapered milling, indexing and the like. The spindle also can be driven by an auxiliary electric motor merely by replacing gear 70 with a V pulley and driving the spindle with a V-belt drive. This permits the unit to be used as a grinder too.

Various types of drive means between the table feed screw and the spindle can be used, but the gear drive shown is easy to change, positive and relatively low cost.

Because various forms of hardware can be used, the specific embodiment shown is for illustrative purposes only and not by way of limitation.

The block 207 will move up and down with the spindle if the set screw 210 is loosened. The adjustment is thus automatically made if the spindle is vertically moved. The fit between the drawbar and the shaft 211 is close enough to cause this movement.

What is claimed is:

1. For a milling machine having a cutting tool rotatable about a substantially vertical axis, power means to rotate said cutting tool, a work table having a surface substantially perpendicular to the axis of rotation of the cutting tool, power means to move said work table back and forth in a path of movement transverse to the rotational axis of said cutting tool, the improvement comprising a work piece holding attachment including a support member, means to attach said support member to the surface of said table, a spindle member, means for rotatably mounting said spindle member on said support member for rotation about an axis lying in a plane substantially perpendicular to the table surface and substantially parallel to the axis of rotation of said cutting tool, said means for mounting said spindle member to said support member including a housing, and adjustable means between said housing and said support member, said adjustable means permitting the adjustment of the axis of rotation of said spindle in said plane, and with respect to the table surface; means to hold a work piece at one end of said spindle, and drive means connected between said spindle and the power means for moving said table so as to rotate said spindle about its axis whenever said table is moved, movement of said table thereby moving said means to hold a work piece toward or away from said cutting tool as said spindle rotates.

2. The combination as specified in claim 1 wherein said means for moving said table comprises a table feed screw, said table feed screw having an end protruding beyond said table, a quick change spur gear set mounted to said table feed screw, and a second quick change spur gear set mounted to drive said spindle, and drive means between said quick change spur gear sets.

3. For a milling machine having a cutting tool rotatable about a substantially vertical axis, power means to rotate said cutting tool, a work table, table feed screw means to move said work table in direction transverse to the rotational axis of said cutting tool, the improvement comprising a milling head attachment including a support member, means to attach said support member to said table, a spindle rotatably mounted on said support member for rotation about an axis, means to hold a work piece at one end of said spindle, and drive means connected between said spindle and the table feed screw so as to rotate said spindle whenever said table is moved, said table feed screw having an end protruding beyond said table, said drive means including a quick change spur gear set mounted to said table feed screw, a second quick change spur gear set mounted to drive said spindle, and drive means between said quick change spur gear sets, said quick change spur gear sets including gear mounting blocks, said mounting blocks being mounted on substantially upright shafts, and means to releasably secure said mounting blocks along said upright shafts so as to change the center distances in each of said quick change spur gear sets.

4. For a milling machine having a cutting tool rotatable about a substantially vertical axis, power means to rotate said cutting tool, a work table, power activated table feed screw means to move said work table in direction transverse to the rotational axis of said cutting tool, the improvement comprising a milling head attachment including a support member; means to attach said support member to said table; a spindle rotatably mounted on said support member for rotation about an axis; means to hold a work piece at one end of said spindle; drive means connected between said spindle and the table feed screw so as to rotate said spindle whenever said table is moved, said table feed screw having an end protruding beyond said table, said drive means including a quick change spur gear set mounted to said table feed screw, a second quick change spur gear set, drive means between said quick change spur gear sets, and adjustable means to mount said second quick change spur gear set so that the plane of movement of said spur gears of said second set can be inclined with respect to the horizontal; and adjustable means to mount said spindle to said support member so as to change the angle of the axis of rotation of said spindle with respect to the rotational axis of the cutting tool.

5. The combination as specified in claim 1 wherein said spindle is longitudinally slidably mounted in said support member, and releasable means to adjustably secure said spindle against longitudinal movement.

6. The combination as specified in claim 1 wherein said spindle is a tubular member, a tapered interior surface at one end of said tubular member, a collet for holding a work piece and having a tapered exterior surface adapted to collide with said tapered interior surface, and a drawbar extending throughout the length of said tubular spindle, said drawbar being threadably mounted to said collet at one end thereof and having threadable means at the other end thereof, said threadable means at said other end exerting a friction force against a drive gear of said second quick change spur gear set to frictionally clamp said drive gear against said spindle as it forces the tapered surfaces on the interior of said spindle and the exterior of said collet together.

7. The combination as specified in claim 1 wherein said support member includes means to raise and lower said spindle housing with respect to said table.

8. The combination as specified in claim 7 wherein said support member includes a sleeve, a column slidably mounted in the sleeve, and said means to raise and lower said support member includes rack and pinion gear drive means between the column and said sleeve.

9. The combination as specified in claim 8 and releasable lock means between said sleeve and column.

10. The milling machine attachment of claim 1 wherein said power means for moving said table comprises a table feed screw, said table feed screw having an end protruding beyond said table, and gear means driven by said table feed screw, said gear means having an output shaft, means to drivably connect said output shaft to said spindle, and means to permit changing the gear ratio of said gear means to change the speed of rotation of the output shaft with respect to said table feed screw.

References Cited
UNITED STATES PATENTS

| | | | |
|---|---|---|---|
| 1,794,361 | 3/1931 | Armitage et al. | 90—11.1 |
| 2,341,619 | 2/1944 | Huss | 269—60 |
| 2,434,639 | 1/1948 | Bugatti | 90—11.1 |
| 2,652,750 | 9/1953 | Lacy | 90—11.62 |
| 2,871,768 | 2/1959 | Froberg | 269—59 |
| 2,923,206 | 2/1960 | Kouac | 90—11.62 |

ANDREW R. JUHASZ, Primary Examiner

G. WEIDENFELD, Assistant Examiner

U.S. Cl. X.R.

90—11